March 7, 1967          L. M. HUDSON          3,307,898

OPTICALLY COMPENSATED LOOM TYPE OPTICAL OBJECTIVE

Filed Sept. 30, 1963          2 Sheets-Sheet 1

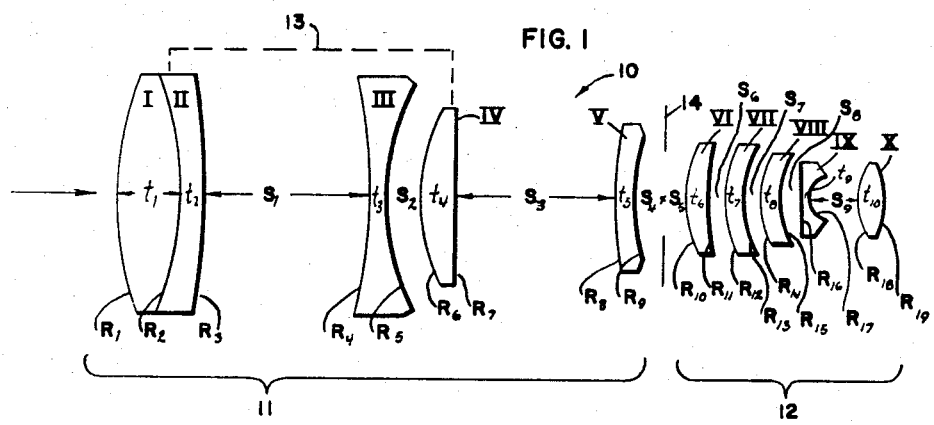

| LENS | RADII | THICKNESSES | SPACES | $n_D$ | $\nu$ |
|---|---|---|---|---|---|
| | VARIABLE FOCAL LENGTH 9.0 mm. to 25.5 mm. f/1.0 | | | | |
| I | $R_1 = 75.07$ / $-R_2 = 46.48$ | $t_1 = 8.00$ | $S_1 = 23.0$ T / $S_1 = 1.10$ WA | 1.611 | 57.2 |
| II | $-R_3 = 128.70$ | $t_2 = 1.58$ | $S_2 = 5.65$ T | 1.720 | 36.2 |
| III | $-R_4 = 116.00$ / $R_5 = 25.69$ | $t_3 = 1.50$ | $S_2 = 27.55$ WA / $S_3 = 23.0$ T | 1.720 | 42.0 |
| IV | $R_6 = 25.01$ / $R_7 = $ PLANO | $t_4 = 4.95$ | $S_3 = 1.10$ WA / $S_4 = 5.00$ | 1.720 | 50.0 |
| V | $R_8 = 364.0$ / $R_9 = 40.07$ | $t_5 = 1.00$ | DIAPHRAGM / $S_5 = 1.00$ | 1.720 | 47.5 |
| VI | $R_{10} = 14.26$ / $R_{11} = 42.71$ | $t_6 = 1.97$ | $S_6 = 0.05$ / $S_7 = 0.05$ | 1.720 | 50.0 |
| VII | $R_{12} = 13.28$ / $R_{13} = 19.40$ | $t_7 = 1.37$ | $S_8 = 0.60$ / $S_9 = 2.93$ | 1.720 | 50.0 |
| VIII | $R_{14} = 7.20$ / $R_{15} = 23.55$ | $t_8 = 2.55$ | | 1.691 | 54.8 |
| IX | $R_{16} = $ PLANO / $R_{17} = 4.30$ | $t_9 = 1.00$ | | 1.751 | 27.8 |
| X | $R_{18} = 11.99$ / $-R_{19} = 9.51$ | $t_{10} = 2.14$ | | 1.657 | 57.2 |

FIG. 2

| LENS | RADII | THICKNESSES | SPACES | $n_D$ | $\nu$ |
|---|---|---|---|---|---|
| | VARIABLE FOCAL LENGTH 9.0 mm. to 25.5 mm. f/1.0 | | | | |
| I | $R_1 = 109.10$ / $-R_2 = 67.56$ | $t_1 = 11.60$ | $S_1 = 33.35$ T / $S_1 = 1.60$ WA | 1.611 | 57.2 |
| II | $-R_3 = 186.20$ | $t_2 = 2.29$ | $S_2 = 8.20$ T | 1.720 | 36.2 |
| III | $-R_4 = 167.75$ / $R_5 = 37.29$ | $t_3 = 2.18$ | $S_2 = 39.95$ WA / $S_3 = 33.35$ T | 1.720 | 42.0 |
| IV | $R_6 = 36.29$ / $R_7 = $ PLANO | $t_4 = 7.18$ | $S_3 = 1.60$ WA / $S_4 = 5.00$ | 1.720 | 50.0 |
| V | $R_8 = 526.5$ / $R_9 = 58.10$ | $t_5 = 1.45$ | DIAPHRAGM / $S_5 = 1.00$ | 1.720 | 47.5 |
| VI | $R_{10} = 14.30$ / $R_{11} = 42.71$ | $t_6 = 1.97$ | $S_6 = 0.05$ / $S_7 = 0.13$ | 1.720 | 47.5 |
| VII | $R_{12} = 13.28$ / $R_{13} = 19.50$ | $t_7 = 1.37$ | $S_8 = 1.02$ / $S_9 = 2.93$ | 1.720 | 47.5 |
| VIII | $R_{14} = 7.40$ / $R_{15} = 23.55$ | $t_8 = 2.31$ | | 1.691 | 54.8 |
| IX | $R_{16} = $ PLANO / $R_{17} = 4.14$ | $t_9 = 1.00$ | | 1.7506 | 27.8 |
| X | $R_{18} = 11.99$ / $-R_{19} = 8.73$ | $t_{10} = 2.44$ | | 1.691 | 54.8 |

*INVENTOR.*
LENA M. HUDSON

BY Frank C. Parker

ATTORNEY

March 7, 1967  L. M. HUDSON  3,307,898
OPTICALLY COMPENSATED LOOM TYPE OPTICAL OBJECTIVE
Filed Sept. 30, 1963  2 Sheets-Sheet 2
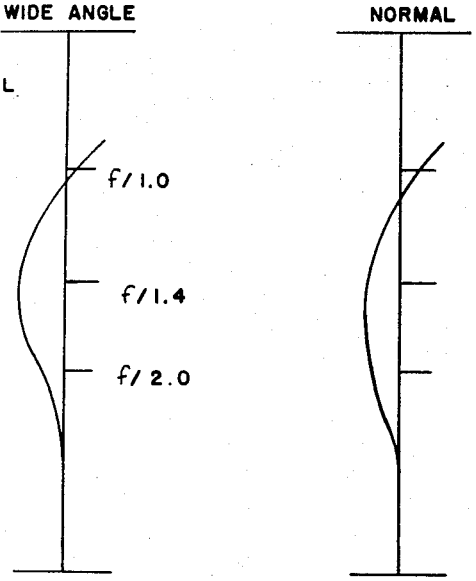
FIG. 4 — WIDE ANGLE, SPHERICAL (f/1.0, f/1.4, f/2.0)
FIG. 5 — NORMAL
FIG. 6 — TELEPHOTO
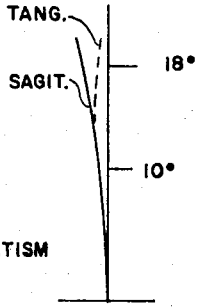
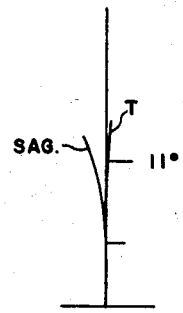
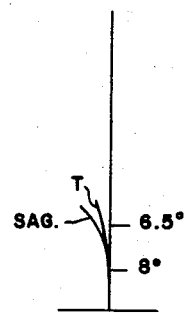
FIG. 7 — WIDE ANGLE, ASTIGMATISM (TANG., SAGIT., 18°, 10°)
FIG. 8 — NORMAL (SAG., T, 11°)
FIG. 9 — TELEPHOTO (SAG., T, 6.5°, 8°)
ASTIGMATISM
*INVENTOR.*
LENA M. HUDSON
BY Frank C. Parker
ATTORNEY

United States Patent Office

3,307,898
Patented Mar. 7, 1967

3,307,898
OPTICALLY COMPENSATED LOOM TYPE
OPTICAL OBJECTIVE
Lena M. Hudson, Brighton, N.Y., assignor to Bausch &
Lomb Incorporated, Rochester, N.Y., a corporation of
New York
Filed Sept. 30, 1963, Ser. No. 312,636
4 Claims. (Cl. 350—184)

The present invention relates to a zoom or continuously variable focal length optical objective and more particularly relates to improvements therein.

In pancratic optical systems of the zoom or continuously variable focal length type having an image magnification range in the neighborhood of 3, it is difficult to achieve an acceptable degree of aberration corrections for photographic and kindred purposes. If said corrections are brought to a satisfactory state at one end of the zoom range, the corrections are much below acceptable standards at the other end of the zoom range. This fact is particularly true of spherical aberration and astigmatism but also extends to other optical performance characteristics such, for instance, as coma.

It is an object of the present invention to provide an optically compensated variable focal length objective of the zoom type having a range of magnification change of about 3, said objective being well corrected for spherical and chromatic aberrations, coma, and astigmatism throughout the entire range of magnification.

A further object is to provide such a device which has an abnormally large numerical aperture of at least $f/1.0$, and a good correction for distortion of the image while using only low-cost lens construction.

Further objects and advantages will be apparent in the optical constructional details from a study of the specification herebelow taken in connection with the drawings, wherein:

FIG. 1 is an optical diagram showing an optical objective constructed according to the present invention;

FIG. 2 is a chart showing the constructional data for one form of said invention;

FIG. 3 is a chart showing the constructional data for another form of said invention;

FIGS. 4, 5 and 6 are graphical representations showing the good state of corrections for spherical aberration obtained by said objective for three typical operating positions thereof; and FIGS. 7, 8 and 9 are diagrammatic representations of the excellent state of correction of sagittal and tangential astigmatism present in said objective.

Generally, the zoom type objective here disclosed is constructed of simple lens parts which are most economical to manufacture, said parts furthermore having comparatively flat surface curvatures and the glass being of high refractive index which tends to result in low spherical aberration.

In the drawings, the objective is designated generally by the numeral 10 and consists of a front group 11 of lenses which includes the movable "zoom" lenses, and further consists of a rear group 12 of stationary lenses called the "main" lens which is optically aligned with said front lens group 11. It will be understood that the name "zoom" in current optical parlance means a continuously variable focal length, power or magnification between two specified limits of variation.

The front lens nearest to entrant light as indicated by the arrow is a doublet and is composed of a front double convex lens element designated I which lies in contact with a rear negative meniscus lens element designated II. Lens (I,II) is operatively connected to a rearward plano concavo singlet lens designated IV for axial movement in unison to change the image magnification continuously throughout a range of magnifications of about 3. The numeral 13 represents diagrammatically the connecting element extending between the movable doublet lens (I,II) and singlet lens IV whereby those lenses are always maintained at a constant distance from each other. Between the doublet (I,II) and singlet IV is aligned a stationary double concave negative lens designated III and rearmost in the front group 11 is arranged a stationary negative meniscus singlet lens which is designated V.

In the space between the front and rear lens groups is aligned a diaphragm 14 which serves as the aperture stop of the entire optical system.

Comprised in the rear lens group 12 is a sequence of mutually spaced and aligned singlet lenses, the foremost three lenses being of positive meniscus form and being designated VI, VII and VIII. In rearmost position is located a double convex lens designated X and between lenses VIII and X is spaced an interposed plano-concave lens designated IX.

The constructional data for the lens elements of the objective 10 are so determined by computation and experiment that all of the aforementioned objects of this invention are fulfilled. To this end, the values for the radii of the successive lens surfaces which are designated $R_1$ to $R_{19}$, are specified in the table of mathematical expressions herebelow, the minus (—) sign used therewith applying to those surfaces having their centers of curvature lying on the entrant side of their vertices.

Stated as mathematical inequalities, the values of the successive radii $R_1$ to $R_{19}$ may be stated in terms of F which is the equivalent focal length of the rear group of lenses 12 per se in the table of mathematical expressions herebelow, $5.6F < R_1 < 9.5F$
$3.0F < -R_2 < 6.0F$
$9.6F < -R_3 < 15.0F$
$8.0F < -R_4 < 14.0F$
$1.4F < R_5 < 3.5F$
$1.70F < R_6 < 3.6F$
$R_7 > \pm 5.0F$
$25.0F < R_8 < 45.0F$
$2.8F < R_9 < 5.0F$
$1.0F < R_{10} < 1.5F$
$3.0F < R_{11} < 3.6F$
$.80F < R_{12} < 1.20F$
$1.0F < R_{13} < 2.0F$
$.50F < R_{14} < .62F$
$1.0F < R_{15} < 2.2F$
$R_{16} > \pm 5.0F$
$.30F < R_{17} < .34F$
$.90F < R_{18} < .95F$
$.64F < R_{19} < .80F$ Stated in the same manner, the successive axial thicknesses $t_1$ to $t_{10}$ of the lens elements I to X as well as the axial spaces therebetween which are designated $S_1$ to $S_9$ are set forth in the tables herebelow, the $S_1$, $S_2$ and $S_3$ values being given for telephoto condition and wide angle condition positions, $.58F < t_1 < .92F$
$.11F < t_2 < .19F$
$.10F < t_3 < .18F$
$.34F < t_4 < .59F$
$.06F < t_5 < .13F$
$.14F < t_6 < .17F$
$.09F < t_7 < .12F$
$.16F < t_8 < .21F$
$.06F < t_9 < .09F$
$.16F < t_{10} < .20F$ $1.70F < S_1 < 2.60F$ (T)
$.06F < S_1 < .14F$ (WA)
$.42F < S_2 < .65F$ (T)
$2.10F < S_2 < 3.10F$ (WA)
$1.70F < S_3 < 2.70F$ (T)
$.07F < S_3 < .14F$ (WA)
$.35F < S_4 < .41F$
Diaphragm
$.06F < S_5 < .09F$
$.003F < S_6 < .005F$
$.001F < S_7 < .015F$
$.03F < S_8 < .09F$
$.21F < S_9 < .24F$ wherein T signifies the telephoto position of the optical system, and WA signifies the wide angle position.

The corresponding values for the refractive index $n_D$ and Abbe number $\nu$ of the glasses in the successive lens elements I to X are given in the table herebelow wherein it is noted that relatively high index glasses are selected throughout the optical system which contributes toward reduction of spherical aberration, the values being absolute.

$1.606 < n_D(I) < 1.616$
$1.715 < n_D(II) < 1.725$
$1.715 < n_D(III) < 1.725$
$1.715 < n_D(IV) < 1.725$
$1.715 < n_D(V) < 1.725$
$1.715 < n_D(VI) < 1.725$
$1.715 < n_D(VII) < 1.725$
$1.685 < n_D(VIII) < 1.695$
$1.745 < n_D(IX) < 1.756$
$1.652 < n_D(X) < 1.696$ $52.0 < \nu(I) < 62.0$
$32.0 < \nu(II) < 40.0$
$38.0 < \nu(III) < 46.0$
$45.0 < \nu(IV) < 55.0$
$42.0 < \nu(V) < 52.0$
$45.0 < \nu(VI) < 55.0$
$45.0 < \nu(VII) < 55.0$
$50.0 < \nu(VIII) < 60.0$
$24.0 < \nu(IV) < 31.0$
$52.0 < \nu(X) < 62.0$

The values in terms of F for two specific successful forms of the present invention are disclosed hereinafter, the first form being set forth in the consolidated following table wherein the symbolism remains the same as above.

$R_1 = 8.40F$
$-R_2 = 5.18F$
$-R_3 = 14.33F$
$-R_4 = 12.89F$
$R_5 = 2.86F$
$R_6 = 2.79F$
$R_7 = $ Plano
$R_8 = 40.3F$
$R_9 = 4.46F$
$R_{10} = 1.10F$ $R_{11} = 3.28F$
$R_{12} = 1.023F$
$R_{13} = 1.50F$
$R_{14} = .568F$
$R_{15} = 1.81F$
$R_{16} = $ Plano
$R_{17} = .318F$
$R_{18} = .925F$
$-R_{19} = .672F$ $t_1 = .892F$
$t_2 = .176F$
$t_3 = .168F$
$t_4 = .552F$
$t_5 = .1115F$
$t_6 = .1513F$
$t_7 = .1053F$
$t_8 = .1777F$
$t_9 = .0768F$
$t_{10} = .188F$ $S_1 = 2.561F$ (T)
$S_1 = .1238F$ (WA)
$S_2 = .630F$ (T)
$S_2 = 3.08F$ (WA)
$S_3 = 2.565F$ (T)
$S_3 = .123F$ (WA)
$S_4 = .384F$
Diaphragm
$S_5 = .0769F$
$S_6 = .00384F$
$S_7 = .0100F$
$S_8 = .0786F$
$S_9 = .2255F$ wherein T signifies the telephoto position of the optical system and WA denotes the wide angle position.

Absolute values:
$n_D(I) = 1.611$
$n_D(II) = 1.720$
$n_D(III) = 1.720$
$n_D(IV) = 1.720$
$n_D(V) = 1.720$
$n_D(VI) = 1.720$
$n_D(VII) = 1.720$
$n_D(VIII) = 1.691$
$n_D(IX) = 1.7506$
$n_D(X) = 1.691$ Absolute values:
$\nu(I) = 57.2$
$\nu(II) = 36.2$
$\nu(III) = 42.0$
$\nu(IV) = 50.0$
$\nu(V) = 47.5$
$\nu(VI) = 47.5$
$\nu(VII) = 47.5$
$\nu(VIII) = 54.8$
$\nu(IX) = 27.8$
$\nu(X) = 54.8$ For the second form of the invention, the values in the terms of F are set forth specifically similarly to the first form in the consolidated table herebelow, $R_1 = 5.78F$
$-R_2 = 3.57F$
$-R_3 = 9.90F$
$-R_4 = 8.92F$
$R_5 = 1.97F$
$R_6 = 1.923F$
$R_7 = $ Plano
$R_8 = 27.95F$
$R_9 = 3.08F$
$R_{10} = 1.10F$ $R_{11} = 3.28F$
$R_{12} = 1.023F$
$R_{13} = 1.49F$
$R_{14} = .553F$
$R_{15} = 1.810F$
$R_{16} = $ Plano
$R_{17} = .330F$
$R_{18} = .925F$
$-R_{19} = .730F$ $t_1 = .616F$
$t_2 = .1215F$
$t_3 = .1155F$
$t_4 = .381F$
$t_5 = .077F$
$t_6 = .1517F$
$t_7 = .1053F$
$t_8 = .196F$
$t_9 = .077F$
$t_{10} = .1646F$ $S_1 = 1.77F(T)$
$S_1 = .0846F(WA)$
$S_2 = .436F(T)$
$S_2 = 2.12F(WA)$
$S_3 = 1.77F(T)$
$S_3 = .0846F(WA)$
$S_4 = .385F$
Diaphragm
$S_5 = .077F$
$S_6 = .00385F$
$S_7 = .00385F$
$S_8 = .0462F$
$S_9 = .2255F$ $n_D(I) = 1.611$
$n_D(II) = 1.720$
$n_D(III) = 1.720$
$n_D(IV) = 1.720$
$n_D(V) = 1.720$
$n_D(VI) = 1.720$
$n_D(VII) = 1.720$
$n_D(VIII) = 1.691$
$n_D(IX) = 1.751$
$n_D(X) = 1.657$ $\nu(I) = 57.2$
$\nu(II) = 36.2$
$\nu(III) = 42.0$
$\nu(IV) = 50.0$
$\nu(V) = 47.5$
$\nu(VI) = 50.0$
$\nu(VII) = 50.0$
$\nu(VIII) = 54.8$
$\nu(IX) = 27.8$
$\nu(X) = 57.2$ The symbols T and WA used with the $S_1$ to $S_3$ values signify telephoto and wide angle positions respectively of the movable lens parts.

The aforesaid first form of the invention is specified in the chart of constructional data herebelow wherein the values are all given numerically, the symbolism used being the same as heretofore.

[Variable focal length, 9.0 mm. to 25.5 mm., f/1.0]

| Lens | Radii | Thicknesses | Spaces | $n_D$ | $\nu$ |
|---|---|---|---|---|---|
| I | $R_1 = 109.10$ | $t_1 = 11.60$ | | 1.611 | 57.2 |
| II | $-R_2 = 67.56$ | $t_2 = 2.29$ | | 1.720 | 36.2 |
|  | $-R_3 = 186.20$ | | $S_1 = 33.35$ (T) $S_1 = 1.60$ (WA) | | |
| III | $-R_4 = 167.75$ | $t_3 = 2.18$ | | 1.720 | 42.0 |
|  | $R_5 = 37.29$ | | $S_2 = 8.20$ (T) $S_2 = 39.95$ (WA) | | |
| IV | $R_6 = 36.29$ | $t_4 = 7.18$ | | 1.720 | 50.0 |
|  | $R_7 = $ Plano | | $S_3 = 33.35$ (T) $S_3 = 1.60$ (WA) | | |
| V | $R_8 = 526.5$ | $t_5 = 1.45$ | | 1.720 | 47.5 |
|  | $R_9 = 58.10$ | | $S_4 = 5.00$ Diaphragm $S_5 = 1.00$ | | |
| VI | $R_{10} = 14.30$ | $t_6 = 1.97$ | | 1.720 | 47.5 |
|  | $R_{11} = 42.71$ | | $S_6 = 0.05$ | | |
| VII | $R_{12} = 13.28$ | $t_7 = 1.37$ | | 1.720 | 47.5 |
|  | $R_{13} = 19.50$ | | $S_7 = 0.13$ | | |
| VIII | $R_{14} = 7.40$ | $t_8 = 2.31$ | | 1.691 | 54.8 |
|  | $R_{15} = 23.55$ | | $S_8 = 1.02$ | | |
| IX | $R_{16} = $ Plano | $t_9 = 1.00$ | | 1.7506 | 27.8 |
|  | $R_{17} = 4.14$ | | $S_9 = 2.93$ | | |
| X | $R_{18} = 11.99$ | $t_{10} = 2.44$ | | 1.691 | 54.8 |
|  | $-R_{19} = 8.73$ | | | | |

The symbols T and WA used with the $S_1$ to $S_3$ values signify telephoto and wide angle positions respectively of the movable lens parts.

With respect to the constructional data pertaining to the aforesaid second form of the invention, the numerical values of such data are given in the chart below similarly to the data related to the first form, the symbolism being the same as above noted.

[Variable focal length, 9.0 mm. to 25.5 mm., f/1.0]

| Lens | Radii | Thicknesses | Spaces | $n_D$ | $\nu$ |
|---|---|---|---|---|---|
| I | $R_1 = 75.07$ | $t_1 = 8.00$ | | 1.611 | 57.2 |
| II | $-R_2 = 46.48$ | $t_2 = 1.58$ | | 1.720 | 36.2 |
|  | $-R_3 = 128.70$ | | $S_1 = 23.0$ (T) $S_1 = 1.10$ (WA) | | |
| III | $-R_4 = 116.0$ | $t_3 = 1.50$ | | 1.720 | 42.0 |
|  | $R_5 = 25.69$ | | $S_2 = 5.65$ (T) $S_2 = 27.55$ (WA) | | |
| IV | $R_6 = 25.01$ | $t_4 = 4.95$ | | 1.720 | 50.0 |
|  | $R_7 = $ Plano | | $S_3 = 23.0$ (T) $S_3 = 1.10$ (WA) | | |
| V | $R_8 = 364.0$ | $t_5 = 1.00$ | | 1.720 | 47.5 |
|  | $R_9 = 40.07$ | | $S_4 = 5.00$ Diaphragm $S_5 = 1.00$ | | |
| VI | $R_{10} = 14.26$ | $t_6 = 1.97$ | | 1.720 | 50.0 |
|  | $R_{11} = 42.71$ | | $S_6 = 0.05$ | | |
| VII | $R_{12} = 13.28$ | $t_7 = 1.37$ | | 1.720 | 50.0 |
|  | $R_{13} = 19.40$ | | $S_7 = 0.05$ | | |
| VIII | $R_{14} = 7.20$ | $t_8 = 2.55$ | | 1.691 | 54.8 |
|  | $R_{15} = 23.55$ | | $S_8 = 0.60$ | | |
| IX | $R_{16} = $ Plano | $t_9 = 1.00$ | | 1.751 | 27.8 |
|  | $R_{17} = 4.30$ | | $S_9 = 2.93$ | | |
| X | $R_{18} = 11.99$ | $t_{10} = 2.14$ | | 1.657 | 57.2 |
|  | $-R_{19} = 9.51$ | | | | |

The symbols T and WA used with the $S_1$ to $S_3$ values signify telephoto and wide angle positions respectively of the movable lens parts.

It will be realized from the foregoing description that there is here provided a zoom type of variable focal length objective which is characterized by an unusually large numerical aperture of at least f/1.0 without incurring depreciation in the excellent state of aberration correction in all operative positions thereof known as wide angle to telephoto conditions. Although only certain forms of the present invention have been shown and described in detail, other forms are possible and changes may be made in the details and data thereof within the limits claimed without departing from the spirit of the invention as claimed in the claims here appended.

I claim:

1. A variable focal length optical objective of the zoom optically compensated type having a range of focal length variation of about 3 and having a relative aperture of f/1.0, said objective being corrected in a superior manner for spherical and chromatic aberrations, sagittal and tangential astigmatism, coma, and field curvature, said objective being composed of two spaced lens groups between which a diphragm is interposed, the front lens group nearest to entrant light comprising a movable front doublet lens which is composed of a front double convex lens element designated I in contact with a rear negative meniscus lens element designated II, the group further comprising a stationary rearwardly spaced double concave singlet lens designated III, a movable plano convex singlet lens designated IV which is coupled to said doublet lens at a constant distance therefrom and movable therewith to vary the focal length of said objective, and lastly comprises a rearwardly spaced negative meniscus singlet lens designated V, the rear lens group comprising three positive meniscus singlet lenses designated VI, VII, and VIII spaced from each other and from a rearward plano concave singlet lens designated IX, and spaced rearmost therefrom is a double convex singlet lens designated X, the values of the lens parameters for one specific form of the objective being given substantially in the table of mathematical statements herebelow wherein $R_1$ to $R_{19}$ represent the radii of the successive lens surfaces, the minus (−) sign being applied to those surfaces whose centers of curvature lie on the entrant side of their vertices, the axial thicknesses of the successive lens elements I to X being designated $t_1$ to $t_{10}$, the interlens axial air spaces being designated $S_1$ to $S_9$, $S_4$ and $S_5$ lying on either side of said diaphragm, F denotes the equivalent focal length of said rear lens group, and $n_D$ and $\nu$ represent the refractive index and Abbe number respectively of the glasses from which said lens elements are made,

| | |
|---|---|
| $R_1 = 8.40F$ | $R_{11} = 3.28F$ |
| $-R_2 = 5.18F$ | $R_{12} = 1.023F$ |
| $-R_3 = 14.33F$ | $R_{13} = 1.50F$ |
| $-R_4 = 12.89F$ | $R_{14} = .568F$ |
| $R_5 = 2.86F$ | $R_{15} = 1.81F$ |
| $R_6 = 2.79F$ | $R_{16} = $ Plano |
| $R_7 = $ Plano | $R_{17} = .318F$ |
| $R_8 = 40.3F$ | $R_{18} = .925F$ |
| $R_9 = 4.46F$ | $-R_{19} = .672F$ |
| $R_{10} = 1.10F$ | |
| $t_1 = .892F$ | $S_1 = 2.561F(T)$ |
| $t_2 = .176F$ | $S_1 = .1238F(WA)$ |
| $t_3 = .168F$ | $S_2 = 6.30F(T)$ |
| $t_4 = .552F$ | $S_2 = 3.08F(WA)$ |
| $t_5 = .1115F$ | $S_3 = 2.565F(T)$ |
| $t_6 = .1513F$ | $S_3 = .123F(WA)$ |
| $t_7 = .1053F$ | $S_4 = .384F$ |
| $t_8 = .1777F$ | Diaphragm |
| $t_9 = .0768F$ | $S_5 = .0769F$ |
| $t_{10} = .188F$ | $S_6 = .00384F$ |
| | $S_7 = .0100F$ |
| | $S_8 = .0786F$ |
| | $S_9 = .2255F$ |

Absolute values:

| | |
|---|---|
| $n_D(I) = 1.611$ | $\nu(I) = 57.2$ |
| $n_D(II) = 1.720$ | $\nu(II) = 36.2$ |
| $n_D(III) = 1.720$ | $\nu(III) = 42.0$ |
| $n_D(IV) = 1.720$ | $\nu(IV) = 50.0$ |
| $n_D(V) = 1.720$ | $\nu(V) = 47.5$ |
| $n_D(VI) = 1.720$ | $\nu(VI) = 47.5$ |
| $n_D(VII) = 1.720$ | $\nu(VII) = 47.5$ |
| $n_D(VIII) = 1.691$ | $\nu(VIII) = 54.8$ |
| $n_D(IX) = 1.7506$ | $\nu(IX) = 27.8$ |
| $n_D(X) = 1.691$ | $\nu(X) = 54.8$ | wherein T signifies the telephoto position of the optical system and WA signifies the wide angle position.

2. A variable focal length optical objective of the zoom optically compensated type having a range of focal length variation of about 3 and having a relative aperture of $f/1.0$, said objective being corrected in a superior manner for spherical and chromatic aberrations, sagittal and tangential astigmatism, coma, and field curvature, said objective being composed of two spaced lens groups between which a diaphragm is interposed.

the front lens group nearest to entrant light comprising a movable front doublet lens which is composed of a front double convex lens element designated I in contact with a rear negative meniscus lens element designated II, the group further comprising a stationary rearwardly spaced double concave singlet lens designated III, a movable plano convex singlet lens designated IV which is coupled to said doublet lens at a constant distance therefrom and movable therewith to vary the focal length of said objective, and lastly comprises a rearwardly spaced negative meniscus singlet lens designated V, the rear lens group comprising three positive meniscus singlet lenses designated VI, VII, adn VIII spaced from each other and from a rearward plano concave singlet lens designated IX, and spaced rearmost therefrom is a double convex singlet lens designated X, the values of the lens parameters for a second form of said objective being given substantially in the table of mathematical statements herebelow wherein $R_1$ to $R_{19}$ represent the radii of the successive lens surfaces numbering from the front, the minus (−) sign being applied to those surfaces whose centers of curvature lie on the entrant side of their vertices, the axial thicknesses of the successive lens elements I to X being designated $t_1$ to $t_{10}$, the interlens axial air spaces being designated $S_1$ to $S_9$, $S_4$ and $S_5$ are located at either side of said diaphragm, F denotes the equivalent focal length of said rear lens group, and $n_D$ and $\nu$ represent the refractive index and Abbe number respectively of the glasses from which said lens elements are made,

| | |
|---|---|
| $R_1 = 5.78F$ | $R_{11} = 3.28F$ |
| $-R_2 = 3.57F$ | $R_{12} = 1.023F$ |
| $-R_3 = 9.90F$ | $R_{13} = 1.49F$ |
| $-R_4 = 8.92F$ | $R_{14} = .553F$ |
| $R_6 = 1.923F$ | $R_{15} = 1.81F$ |
| $R_7 = $ Plano | $R_{16} = $ Plano |
| $R_5 = 1.97F$ | $R_{17} = .33F$ |
| $R_8 = 27.95F$ | $R_{18} = .925F$ |
| $R_9 = 3.08F$ | $-R_{19} = .730F$ |
| $R_{10} = 1.10F$ | |
| $t_1 = .616F$ | $S_1 = 1.77F(T)$ |
| $t_2 = .1215F$ | $S_1 = .0846F(WA)$ |
| $t_3 = .1155F$ | $S_2 = .436F(T)$ |
| $t_4 = .381F$ | $S_2 = 2.12F(WA)$ |
| $t_5 = .077F$ | $S_3 = 1.77F(T)$ |
| $t_6 = .1517F$ | $S_3 = .0846F(WA)$ |
| $R_{12} = 1.023F$ | $S_4 = .385F$ |
| $t_8 = .196F$ | |
| $t_9 = .077F$ | Diaphragm |
| $t_{10} = .1646F$ | $S_5 = .077F$ |
| | $S_6 = .00385F$ |
| | $S_7 = .00385F$ |
| | $S_8 = .0462F$ |
| | $S_9 = .2255F$ |

Absolute values:

| | |
|---|---|
| $n_D(I) = 1.611$ | $\nu(I) = 57.2$ |
| $n_D(II) = 1.720$ | $\nu(II) = 36.2$ |
| $n_D(III) = 1.720$ | $\nu(III) = 42.0$ |
| $n_D(IV) = 1.720$ | $\nu(IV) = 50.0$ |
| $n_D(V) = 1.720$ | $\nu(V) = 47.5$ |
| $n_D(VI) = 1.720$ | $\nu(VI) = 50.0$ |
| $n_D(VII) = 1.720$ | $\nu(VII) = 50.0$ |
| $n_D(VIII) = 1.691$ | $\nu(VIII) = 54.8$ |
| $n_D(IX) = 1.751$ | $\nu(IX) = 27.8$ |
| $n_D(X) = 1.657$ | $\nu(X) = 57.2$ | wherein T signifies the telephoto position of the optical system and WA signifies the wide angle position.

3. A zoom type of optical system composed of a succession of optically aligned and mutually spaced lens parts numbered I to X from the light entrant side, the first lens being a positive doublet designated (I,II) which is connected at a constant distance from and to a positive singlet lens designated IV, said doublet and singlet lenses being movable axially in unison to vary the focal length of the system between a wide angle and a telephoto condition, the remaining lenses being air spaced singlets which are stationary, the optical parameters thereof being specified numerically in the chart of values herebelow wherein $R_1$ to $R_{19}$ represent the radii of the successive lens surfaces and the minus (−) sign is applied to those surfaces whose centers of curvature line on the entrant side of their vertices, $t_1$ to $t_{10}$ represent the axial thicknesses of the successive lens parts, $S_1$ to $S_9$ represent the axial air spaces between the lenses, and $n_D$ and $\nu$ represent the refractive index and Abbe number respectively of the materials in said lens parts, wherein T denotes the telephoto position of the optical system and WA denotes the wide angle position.

[Variable focal length, 9.0 mm. to 25.5 mm., f/1.0]

| Lens | Radii | Thicknesses | Spaces | $n_D$ | $\nu$ |
|---|---|---|---|---|---|
| I | $R_1 = 109.10$ | $t_1 = 11.60$ | | 1.611 | 57.2 |
| II | $-R_2 = 67.56$ $-R_3 = 186.20$ | $t_2 = 2.29$ | | 1.720 | 36.2 |
| | | | $S_1 = 33.35$ (T) $S_1 = 1.60$ (WA) | | |
| III | $-R_4 = 167.75$ $R_5 = 37.29$ | $t_3 = 2.18$ | | 1.720 | 42.0 |
| | | | $S_2 = 8.20$ (T) $S_2 = 39.95$ (WA) | | |
| IV | $R_6 = 36.29$ $R_7 =$ Plano | $t_4 = 7.18$ | | 1.720 | 50.0 |
| | | | $S_3 = 33.35$ (T) $S_3 = 1.60$ (WA) | | |
| V | $R_8 = 526.5$ $R_9 = 58.10$ | $t_5 = 1.45$ | | 1.720 | 47.5 |
| | | | $S_4 = 5.00$ Diaphragm $S_5 = 1.00$ | | |
| I | $R_{10} = 14.30$ $R_{11} = 42.71$ | $t_6 = 1.97$ | | 1.720 | 47.5 |
| | | | $S_6 = 0.05$ | | |
| II | $R_{12} = 13.28$ $R_{13} = 19.50$ | $t_7 = 1.37$ | | 1.720 | 47.5 |
| | | | $S_7 = 0.13$ | | |
| VIII | $R_{14} = 7.40$ $R_{15} = 23.55$ | $t_8 = 2.31$ | | 1.691 | 54.8 |
| | | | $S_8 = 1.02$ | | |
| IX | $R_{16} =$ Plano $R_{17} = 4.14$ | $t_9 = 1.00$ | | 1.7506 | 27.8 |
| | | | $S_9 = 2.93$ | | |
| X | $R_{18} = 11.99$ $-R_{19} = 8.73$ | $t_{10} = 2.44$ | | 1.691 | 54.8 |

The symbols T and WA used with the $S_1$ to $S_3$ values signify telephoto and wide angle positions respectively of the movable lens parts.

4. A zoom type of optical system composed of a succession of optically aligned and mutually spaced lens parts numbered I to X from the light entrant side, the first lens being a positive doublet designated (I,II) which is connected at a constant distance from and to a positive singlet lens designated IV, said doublet and singlet lenses being movable axially in unison to vary the focal length of the system between a wide angle and a telephoto condition, the remaining lenses being air spaced singlets which are stationary, the optical parameters thereof being specified numericaly in the chart of values herebelow wherein $R_1$ to $R_{19}$ represent the radii of the successive lens surfaces and the minus (−) sign is applied to those surfaces whose centers of curvature lie on the entrant side of their vertices, $t_1$ to $t_{10}$ represent the axial thicknesses of the successive lens parts, $S_1$ to $S_9$ represent the axial air spaces between the lenses, and $n_D$ and $\nu$ represent the refractive index and Abbe number respectively of the material in said lens parts, wherein T denotes the telephoto position of the optical system and WA denotes the wide angle position,

[Variable focal length, 9.0 mm. to 25.5 mm., f/1.0]

| Lens | Radii | Thicknesses | Spaces | $n_D$ | $\nu$ |
|---|---|---|---|---|---|
| I | $R_1 = 75.07$ | $t_1 = 8.00$ | | 1.611 | 57.2 |
| II | $-R_2 = 46.48$ $-R_3 = 128.70$ | $t_2 = 1.58$ | | 1.720 | 36.2 |
| | | | $S_1 = 23.0$ (T) $S_1 = 1.10$ (WA) | | |
| III | $-R_4 = 116.0$ $R_5 = 25.69$ | $t_3 = 1.50$ | | 1.720 | 42.0 |
| | | | $S_2 = 5.65$ (T) $S_2 = 27.55$ (WA) | | |
| IV | $R_6 = 25.01$ $R_7 =$ Plano | $t_4 = 4.95$ | | 1.720 | 50.0 |
| | | | $S_3 = 23.0$ (T) $S_3 = 1.10$ (WA) | | |
| V | $R_8 = 364.0$ $R_9 = 40.07$ | $t_5 = 1.00$ | | 1.720 | 47.5 |
| | | | $S_4 = 5.00$ Diaphragm $S_5 = 1.00$ | | |
| VI | $R_{10} = 14.26$ $R_{11} = 42.71$ | $t_6 = 1.97$ | | 1.720 | 50.0 |
| | | | $S_6 = 0.05$ | | |
| VII | $R_{12} = 13.28$ $R_{13} = 19.40$ | $t_7 = 1.37$ | | 1.720 | 50.0 |
| | | | $S_7 = 0.05$ | | |
| VIII | $R_{14} = 7.20$ $R_{15} = 23.55$ | $t_8 = 2.55$ | | 1.691 | 54.8 |
| | | | $S_8 = 0.60$ | | |
| IX | $R_{16} =$ Plano $R_{17} = 4.30$ | $t_9 = 1.00$ | | 1.751 | 27.8 |
| | | | $S_9 = 2.93$ | | |
| X | $R_{18} = 11.99$ $-R_{19} = 9.51$ | $t_{10} = 2.14$ | | 1.657 | 57.2 |

The symbols T and WA used with the $S_1$ to $S_3$ values signify telephoto and wide angle positions respectively of the movable lens parts.

No references cited.

JEWELL H. PEDERSEN, *Primary Examiner.*

JOHN K. CORBIN, *Examiner.*

UNITED STATES PATENT OFFICE
CERTIFICATE OF CORRECTION

Patent No. 3,307,898                                    March 7, 1967

Lena M. Hudson

It is hereby certified that error appears in the above numbered patent requiring correction and that the said Letters Patent should read as corrected below.

In the heading to the printed specification, and in the drawings, sheets 1 and 2, for the title "OPTICALLY COMPENSATED LOOM TYPE OPTICAL OBJECTIVE" read -- OPTICALLY COMPENSATED ZOOM TYPE OPTICAL OBJECTIVE --; column 2, line 21, for "concavo" read -- concave --; column 8, line 36, for "$R_{12}=1.023F$" read $t_7=.1053F$ --; line 70 for "line" read -- lie --; column 9, in the table, first column, lines 6 and 7 thereof, for "I" and "II" read -- VI -- and -- VII --.

Signed and sealed this 7th day of November 1967.

(SEAL)
Attest:

EDWARD M. FLETCHER, JR.                      EDWARD J. BRENNER
Attesting Officer                               Commissioner of Patents